(No Model.)

J. C. VETTER.
BLOW PEDAL FOR ORGANS.

No. 277,435.  Patented May 8, 1883.

UNITED STATES PATENT OFFICE.

JOHN C. VETTER, OF NEW HAVEN, CONNECTICUT.

BLOW-PEDAL FOR ORGANS.

SPECIFICATION forming part of Letters Patent No. 277,435, dated May 8, 1883.

Application filed January 11, 1883. (No model.)

*To all whom it may concern:*

Be it known that I, JOHN CONRAD VETTER, of New Haven, in the county of New Haven and State of Connecticut, have invented a new Improvement in Blow-Pedals for Reed-Organs; and I do hereby declare the following, when taken in connection with the accompanying drawings and the letters of reference marked thereon, to be a full, clear, and exact description of the same, and which said drawings constitute part of this specification, and represent, in—

Figure 1:
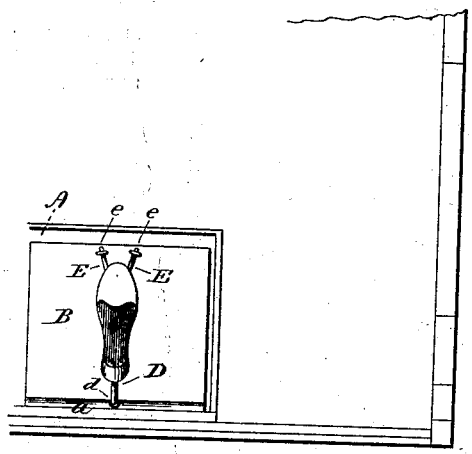
Figure 2:
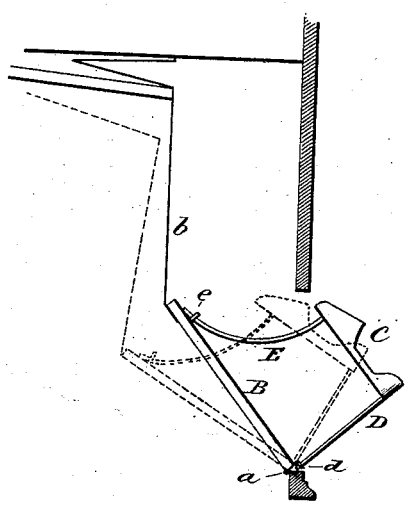

Figure 1, a front view; Fig. 2, a sectional side view.

This invention relates to an improvement in blow-pedals for organs.

In the usual construction the pedal is hinged near the bottom of the front of the case, and works through an opening in the front, so that the player pressing his foot on the pedal depresses it inward. This arrangement for a grown person is sufficient, but for a child some attachment is necessary to enable it to operate the pedal. Auxiliary pedals have been hung to the front above the principal pedal, and various arrangements have been applied, but more or less expensive and inconvenient.

The object of my invention is to construct a pedal for attachment directly to the principal pedal, whereby the foot of the young player will be applied substantially the same as that of a grown person; and the invention consists in the construction of the pedal, as hereinafter described, and more particularly recited in the claim.

A represents the opening in the front of the case through which the pedal is arranged; B, one of the pedals, hinged at *a*, at the bottom of the opening, and so as to turn inward and downward, as seen in broken lines, its inner end connected to the bellows by a strap, *b*, or otherwise, so that the required movement is given to the bellows.

C is the child's pedal, which may be conveniently made in shape of a slipper, as seen in Fig. 1. From it extends a rigid post, D, which fits into a socket, *d*, at the lower end of the pedal B, and from the toe end curved posts, E, extend forward and upward, and enter sockets *e* at the toe of the principal pedal B. The toe of this pedal must clear the upper edge of the opening as it is turned inward, as seen in broken lines, Fig. 2. This is readily done by bringing the heel of the pedal out, so that the post D stands at about right angles to the pedal B, and then, that the pressure on the toe of the pedal may be communicated to the principal pedal, the forward posts, E, are curved inward and upward, so as to take a bearing far up on the principal pedal, even farther than the foot of an ordinary player, whereby the power of the foot applied to the pedal is somewhat increased over what the same foot would be on the principal pedal.

The sockets for the introduction of the posts may simply be holes bored into the principal pedal, and the posts fitted to enter those holes; but I prefer to apply sockets, as shown.

When not required for use the pedal is easily removed, or when required for use is as easily applied, and stands firm and in convenient position for the foot of the child.

I claim—

The combination of the principal blow-pedal B, the pedal C, raised from the plane of the principal pedal, with a post extending from its heel to the lower edge of the principal pedal, and other posts extending from the toe of the pedal C to the upper part of the pedal B, the said pedal B provided with sockets to receive the said posts, whereby the pedal C is removably attached to said pedal B, substantially as described.

JOHN CONRAD VETTER.

Witnesses:
JOHN E. EARLE,
JOS. C. EARLE.